July 13, 1926.

W. H. NOELTING 1,592,043

COATED CORE CASTER AND TRUCK WHEEL

Filed Dec. 1, 1925

INVENTOR.
WILLIAM H. NOELTING.
BY
ATTORNEYS.

Patented July 13, 1926.

1,592,043

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

COATED-CORE CASTER AND TRUCK WHEEL.

Application filed December 1, 1925. Serial No. 72,613.

This invention relates to caster wheels.

The chief object of the invention is to provide a non-marring coating to a caster wheel core or body such that the resultant wheel construction will have sufficient crushing strength to carry the load and will have sufficient cushioning action to prevent seating of the wheel into the floor with the resultant marring thereof, and which will be further protective by having the sides of the wheel similarly protected to prevent marring and scratching of furniture legs and the like which the caster wheel may accidentally contact.

The chief feature of the invention consists in the formation of a caster wheel having a covered tread and side faces.

Another feature of the invention consists in the formation of said side and tread coverings as a continuation of each other.

A third feature of the invention consists in the particular anchorage of the cover material to the wheel body or core.

The full nature of the invention will be understood from the accompanying drawings and the following description and claims.

Figure 1:
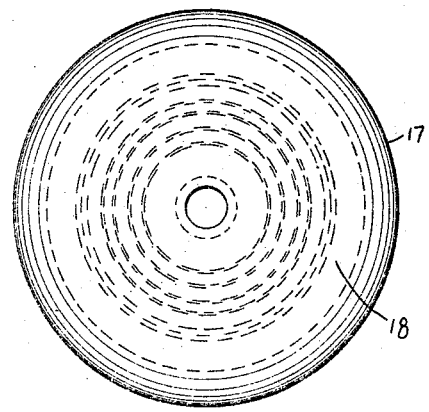
Figure 2:
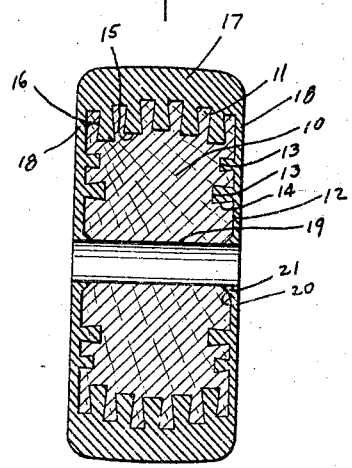
Figure 3:
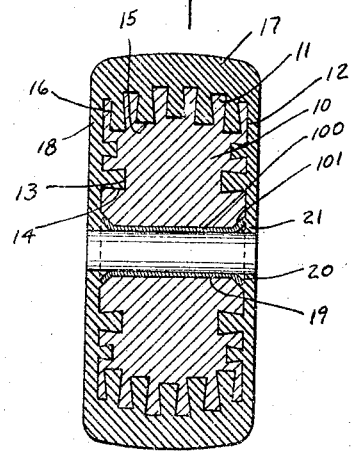

In the drawings, Fig. 1 is a side elevational view of the protected caster wheel. Fig. 2 is a central sectional view of the same. Fig. 3 is a central sectional view of a modified form of the invention.

In the drawings 10 indicates a core body having a crowned periphery 11 and a pair of side faces 12. The side faces 12 herein are shown parallel, but it is to be understood that these faces preferably have the same central angle or dishing, said angle in this instance being 180 degrees, and said side faces are oppositely positioned with respect to each other which condition, of course, applies equally to the median or 180 degree central angle positioning.

Each side face has a plurality of concentric and coaxial anchorage grooves 13 formed therein. These grooves are similar and each annular side wall thereof is inclined to the face as at 14, thus forming a wedge shaped groove of dove tail section. The grooves in said side faces are so arranged that they are oppositely positioned and therefore are all coaxial and opposite grooves in the opposite faces are at substantially the same radial distance from the center of the wheel.

The annular peripheral surface 11 which supports the tread is shown provided with a plurality of coaxial grooves 15 having the inclined side walls 16 so that the grooves also are not only wedge shaped but are also dove tail in section. A plurality of said grooves are provided as indicated and these are symmetrically arranged with reference to the median plane of the wheel.

The particular protective covering consists of a rubber or rubber-like tread portion 17 which can be suitably molded into any desired conformation and integral therewith are the side walls 18, and projecting inwardly from said side walls and said tread portion 18 and 17 respectively, are annular keying portions integral therewith and seatable in the wedge shaped dove tail, sectioned grooves for anchoring the entire integral cover to the wheel body or core 10.

The wheel core 10 has the central axial opening 19 with reduced corners 20 at each end and the cover material is extended inwardly as at 21 of said corners to further immediately anchor the central portion of each side face. The resultant construction, therefore, is in its specific form a wooden cored caster wheel having its entire side and tread surfaces fully protected by an integral cushioning material such as rubber.

In Fig. 3 there is illustrated a central sectional view of a modified form of the invention. In this figure the core 10 has the central aperture 19 and mounted in said central aperture is a metallic bushing 100 having the outwardly flared ends 101 which form the flared openings 20. The remaining parts of the invention are substantially as illustrated and described with reference to the previous form of the invention, and herein the inturned portions 21 of the coating are similarly inturned and seat in the flared portion 20 of the metallic bushing 100.

The invention claimed is:

1. A caster wheel comprising a core having a pair of side surfaces connected by an annular peripheral tread supporting surface, each of said surfaces having a plurality of coaxially arranged locking grooves therein, and an integral moldable covering extending over substantially the entire peripheral and side surfaces and filling said grooves for anchoring said covering to the core.

2. A device as defined by claim 1 characterized by the locking grooves each having an inclined wall leading from the adjacent covering surface to form a wedge section groove.

3. A device as defined by claim 1 characterized by the locking grooves each having a pair of inclined walls leading from the adjacent surface to form a dove tail sectioned groove.

4. A device as defined by claim 1 characterized by the sides of the wheel core having the same central angle and symmetrically arranged with respect to a median plane of the wheel, and the grooves in said side surfaces being coaxially aligned and opposite grooves in opposite faces having substantially the same radius.

5. A device as defined by claim 1 characterized by the peripheral surface or core being crowned and the locking grooves therein being offset laterally with respect to each other and therefore concentric with each other, and coaxial and arranged symetrically with respect to the median plane of the wheel.

6. A device as defined by claim 1 characterized by the peripheral surface or core being crowned and the locking grooves therein being offset laterally with respect to each other and therefore concentric with each other, and coaxial and arranged symmetrically with respect to the median plane of the wheel, said core being further characterized by the sides of the wheel core having the same central angle and symmetrically arranged with respect to a median plane of the wheel, and the grooves in said side surfaces being coaxially aligned and opposite grooves in opposite faces having substantially the same radius.

7. A caster wheel comprising a fibrous core having a pair of side surfaces connected by an annular peripheral tread supporting surface, said core having a central axle opening with flared ends, and an integral moldable covering extending over the entire side and annular surface and having edge portions extending inwardly into the flared portion for anchoring the ends of the cover.

8. A caster wheel comprising a fibrous core having a pair of side surfaces connected by annular peripheral tread supporting surface, said core having a central axle opening, a metallic bushing secured thereto with flared ends, and an integral moldable covering extending over the entire side and annular surfaces and having edge portions extending inwardly into the flared portions for anchoring the ends of the covering.

In witness whereof, I have hereunto affixed my signature.

WILLIAM H. NOELTING.